United States Patent Office 3,528,241
Patented Sept. 15, 1970

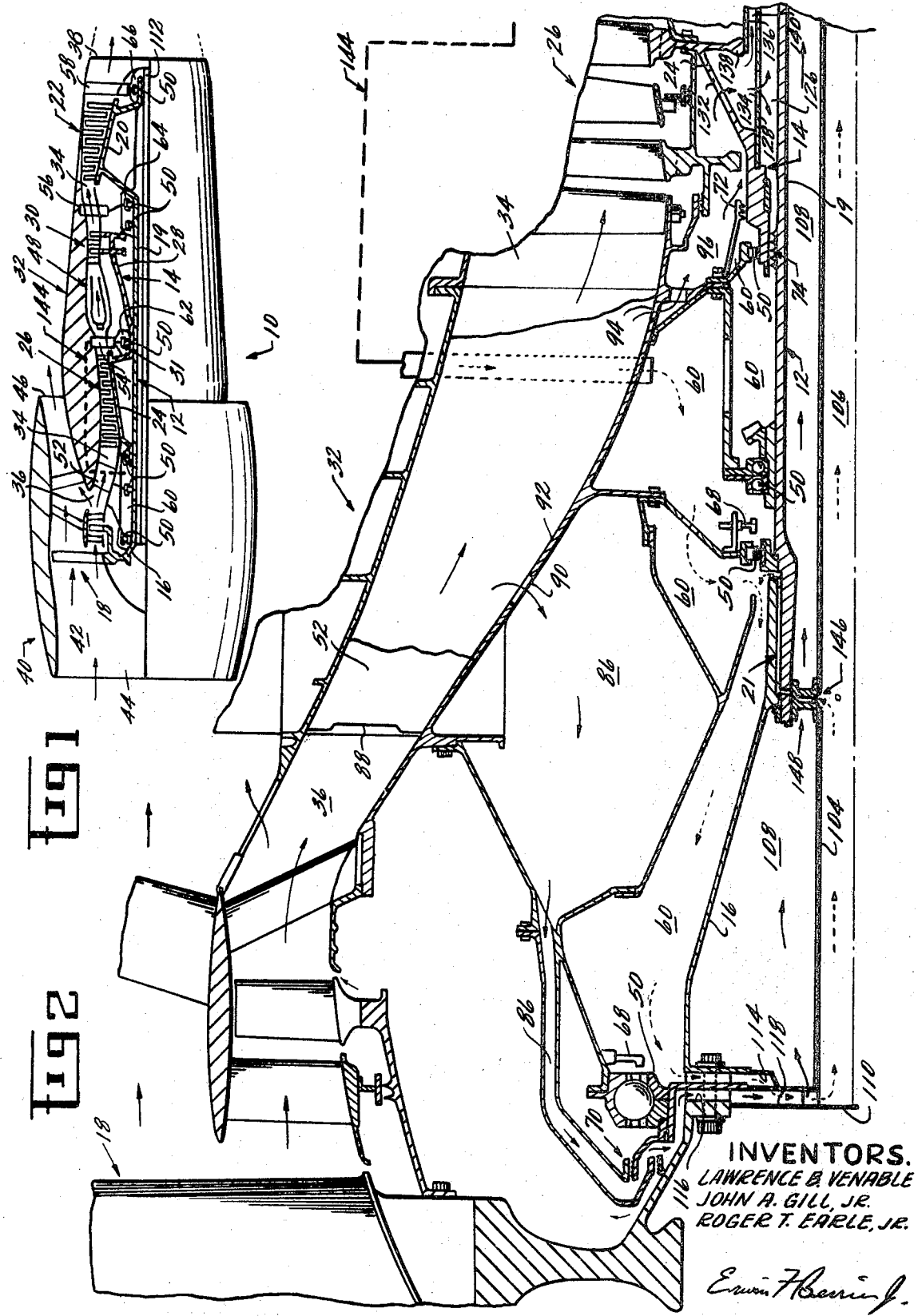

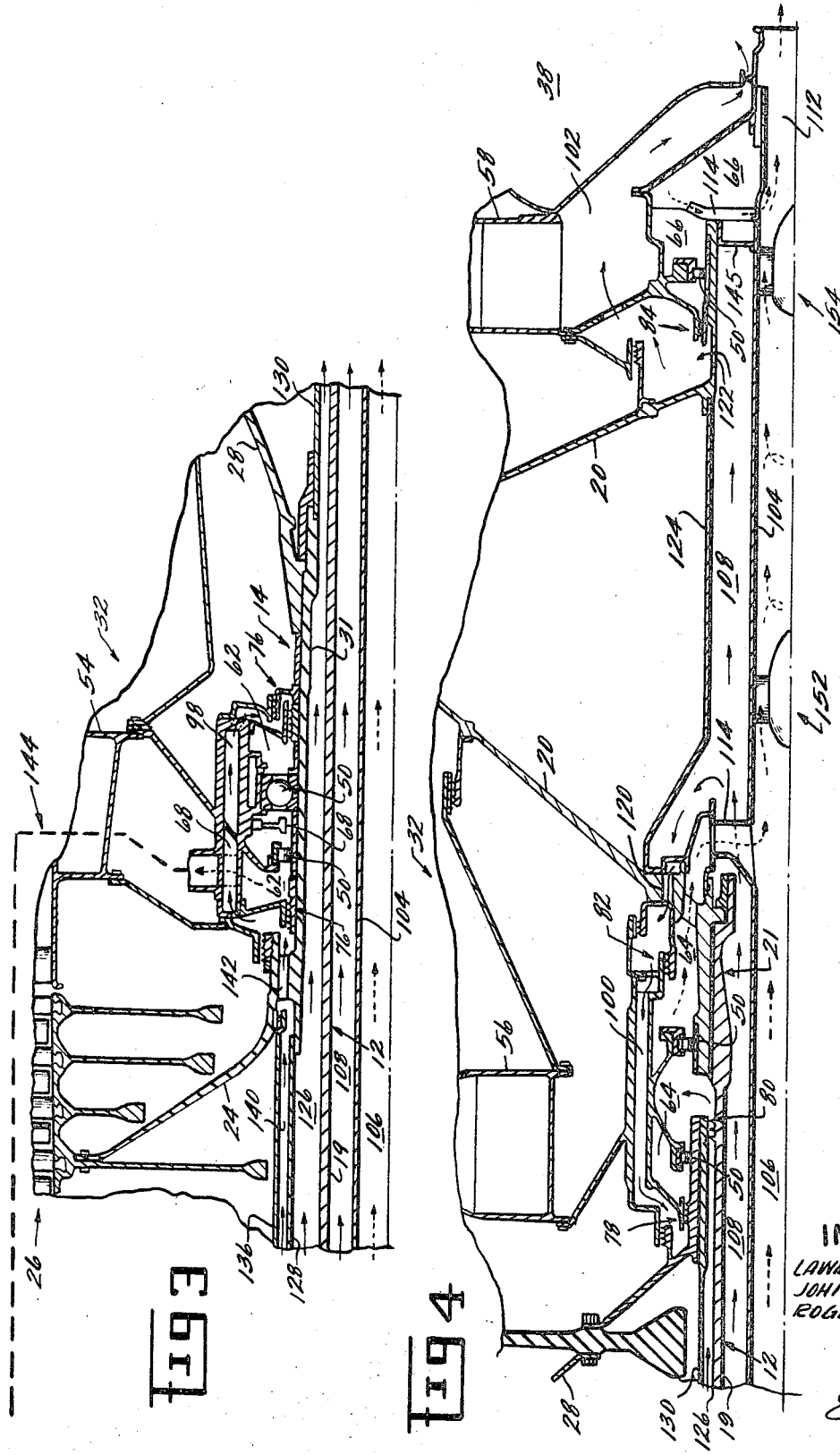

3,528,241
GAS TURBINE ENGINE LUBRICANT SUMP VENT AND CIRCULATING SYSTEM
Lawrence B. Venable and John A. Gill, Jr., Cincinnati, and Roger T. Earle, Jr., Loveland, Ohio, assignors to General Electric Company, a corporation of New York
Filed Feb. 24, 1969, Ser. No. 801,288
Int. Cl. F02c 7/06
U.S. Cl. 60—39.08                                14 Claims

ABSTRACT OF THE DISCLOSURE

A system is disclosed for venting bearing lubricant sump chambers of a single or multiple shafted gas turbine engine through a central vent passage in the innermost shaft in a manner minimizing lubricating fluid losses from the sump chambers. Means are also provided to deliver relatively cool pressurized air from a fan or compressor of the engine into the upstream sump chamber and into the remaining sump chambers through the engine shaft or shafts to thereby establish, in conjunction with the venting system, a flow of relatively cool air through each lubricant sump.

---

This invention relates to gas turbine engines and, more particularly, to an improved lubricant sump venting and air circulation system for such engines.

Gas turbine engines generally comprise one or more hollow shafts journaled within a casing structure by means of a series of bearing assemblies. The bearing assemblies are generally positioned at spaced locations along the shaft or shafts and enclosed by one or more bearing or sump chambers through which a lubricating fluid is circulated. The sump chambers generally include one or more annular seals at the junction of the shaft or shafts and casing structure portion defining the chamber and, in some instances, between shafts. In order to prevent loss of lubricating fluid through such seals and to maintain the lubricating fluid at an acceptable temperature, a system is generally provided to direct relatively cool air into each bearing chamber through its respective seals. In order to maintain a pressure drop across the seals so as to insure a continuous flow of cool air into each sump chamber, air must be removed or vented therefrom. One of the major problems in such lubricant sump air circulation systems is the removal or venting of the air from the sump without carrying overboard excess quantities of lubricating fluid.

In the past it has been common practice to vent the sump chambers through conduits which extend through the struts of the supporting casing structure to a suitable manifold which collects and carries the air-lubricant mixture to a separator system operative to separate the lubricant particles from the vented air before discharge overboard. Typically, the air-lubricant separator system has employed a rotating centrifugal separator located on and driven by an accessory gearbox.

Several problems arise with such prior arrangements. One of the problems is that external conduits, manifolds and accessory separators increase the complexity and cost of the engine. Another disadvantage is that the vented air-lubricant mixture may pass through very warm air cavities which may result in heating and resultant coking and vaporization of the lubricant particles entrained in the vented air. The resultant coking on the vent conduits and the lubricant loss from vaporization are undesirable characteristics of an engine.

Accordingly, a primary object of this invention is to provide a highly effective and simplified system for venting gas turbine engine bearing or sump chambers which overcomes the foregoing problems.

A further object of this invention is to provide an improved and simplified system for circulating relatively cool air through gas turbine engine sump chambers which minimizes external conduit requirements and lubricating fluid losses.

The above ends are achieved in a gas turbine engine of the type having a hollow first shaft by providing means for venting upstream and downstream bearing chambers to a suitable low pressure through a center vent passage defined within the first shaft. Such means preferably include at least one radially extending vent conduit for each bearing chamber for communicating the center vent passage with its respective bearing chamber. The vent conduits are sized to centrifugally prevent dense lubricant particles from entering the central vent passage. Means are also provided to direct fan-pressurized air into the upstream bearing chamber and through the first shaft into the downstream bearing chamber.

Where the gas turbine engine additionally includes an outer shaft concentrically disposed about the first shaft and a bearing chamber intermediate the ends of the outer shaft is employed, such intermediate chamber is vented to the upstream bearing chamber through conduit vent means carried by the casing structure. Means are also provided for directing fan-pressurized air into the intermediate bearing chamber through the outer shaft.

Vortex generating means disposed within the center vent passage may be employed for enhancing centrifugal separation of lubricant particles from the vented air-lubricant mixture.

The structure defining each bearing chamber may include at least one seal at the junction of the portion of the casing structure and shaft or shafts defining each bearing chamber. A seal pressurization chamber is provided for each such seal together with means for delivery of fan-pressurized air into the seal pressurization chambers for leakage through the seals into the bearing chambers whereby a flow of said fan-pressurized air is established through each bearing chamber. In the preferred form, means are provided to direct the fan-pressurized air into the upsteam ones of the outer chambers and hence to the downstream ones of said outer chambers through the interior of said shafts. Where intershaft seals are employed, means are provided to pressurize such seals with fan-pressurized air through the outer shaft.

While the specification concludes with claims particularly pointing out and distinctly claiming the subject matter of this invention, it is believed the invention will be better understood from the following description of the preferred embodiment when taken in connection with the accompanying drawings wherein:

FIG. 1 is a side elevational view, in half cross section, diagrammatically showing a gas turbine engine embodying the present invention;

FIG. 2 is an enlarged cross sectional view showing an upstream portion of the gas turbine engine of FIG. 1;

FIG. 3 is an enlarged cross sectional view showing an intermediate portion of the gas turbine engine of FIG. 1; and FIG. 4 is an enlarged cross section view showing a downstream portion of the gas turbine engine of FIG. 1.

Referring now to FIG. 1, a gas turbine engine has been shown at 10 of the type including hollow inner and outer concentric shafts 12 and 14 respectively. The inner shaft 12 includes a fan rotor 16 for a first compressor or fan 18, a turbine rotor 20 for a second or low pressure turbine 22 and an intermediate, generally cylindrical, portion 19 connected to rotors 16 and 20 through splined connections 21. The outer shaft 14 includes a rotor 24 for a second compressor 26, a turbine rotor 28 for a first or high pressure turbine 30 and an intemediate, generally cylindrical, portion 31.

Hollow casing means 32 are provided which enclose the second compressor 26 and the turbines 22 and 30, and define, in cooperation with the shafts 12 and 14, an annular motive fluid flow passage 34 having an inlet 36, intermediate the fan 18 and the compressor 26, and an exhaust outlet 38 downstream of the second turbine 22. A second casing or fan cowl 40 is provided which encloses the fan 18 and defines, in conjunction with the inner shaft 12 and the casing means 32, an annular fan duct 42 having an inlet 44 and an exhaust nozzle outlet 46.

As will be understood, in operation air is pressurized by the fan 18, exhausted through the nozzle 46 to provide propulsive thrust and delivered into the motive fluid flow passage 34 for, in part, further pressurization by the compressor 26. The pressurized air from the compressor 26 and a suitable fuel are delivered into a combustor 48 wherein the fuel is burned to produce a hot gas stream for driving the first turbine 30, the second turbine 22 and hence, through shafts 14 and 12, respectively, the compressor 26 and fan 18. Further propulsive thrust is provided by exhausting the annular hot gas stream through outlet 38.

The inner and outer shafts 12 and 14 are journaled for rotation by a plurality of bearing assemblies 50 disposed at spaced locations along the shafts. The bearing assemblies 50 are connected to the outer portion of the casing means 32 by a plurality of hollow struts which extend generally radially across the motive fluid flow passage 34. For example, in the gas turbine engine of FIG. 1, upstream struts 52 are provided upstream of the compressor 26, intermediate struts 54 and 56 are provided, respectively, between the compressor 26 and the combustor 48 and between the turbine 30 and the turbine 22, and downstream struts 58 are provided downstream of the turbine 22.

As has been diagrammatically shown in FIG. 1, the casing means 32 is adapted to form, in conjunction with at least one of the shafts 12 and 14, an annular upstream sump or bearing chamber 60, an annular intermediate sump or bearing chamber 62, and downstream sumps or chambers 64 and 66 for enclosing the bearing assemblies 50.

As best shown in FIGS. 2 and 3, a circulating lubrication system is provided for the bearing assemblies 50 which includes a plurality of spray nozzles 68 for, in part, directing a pressurized lubricating fluid against the bearing assemblies 50. The lubricating fluid so injected into the bearing chambers is removed from the chambers by means of scavenge pumps (not shown) and discharged to a suitable reservoir (not shown) for repressurization and redelivery to the bearing chambers.

To prevent loss of the lubricating fluid from the bearing chambers, suitable seals are provided at the junction of the portion of the casing means and the shaft or shafts defining each chamber and, in the case of the upstream sump 60 and the downstream sump 64, a suitable seal is also provided between the shafts 12 and 14. For example, and with reference now to FIG. 2, a seal 70 is provided between the casing means and the inner shaft 12, a seal 72 is provided between the casing means and the outer shaft 14 and a seal 74 is provided between the shafts 12 and 14. In like manner and with reference now to FIGS. 3 and 4, seals 76 are provided at the junction of the portion of the casing means and outer shaft 14 defining the intermediate bearing chamber or sump 62, seals 78, 80 and 82 are provided for downstream bearing chamber 64 and a seal 84 is provided for the downstream bearing chamber 66.

To further prevent lubricant leakage from the bearing chambers as well as to prevent excessive lubricant temperatures which might cause vaporization or coking of the lubricant, a system is provided to circulate relatively cool air pressurized by the fan 18 through each bearing chamber. Generally, this system includes means for delivery of fan pressurized air into the bearing chambers through their respective seals and means for venting or discharging the air from the bearing chambers to the low pressure at the outlet 38.

As shown in FIG. 2, the casing means 32 is adapted to form an outer or seal pressurization chamber 86 in cooperation with the inner shaft 12 and the portion of the casing means defining the bearing chamber 60. At least one of the upstream struts 52 is provided with an opening 88 at its upstream edge to direct fan-pressurized air to the interior of the strut. An opening 90 is then provided in the portion 92 of the casing means to direct the fan-pressurized air from the interior of the strut 52 into the seal pressurization chamber 86. A further opening 94 is provided in the casing means portion 92 to deliver fan-pressurized air from the interior of the strut 52 into a seal pressurization chamber 96 adjacent seal 72. In like manner and with reference now to FIGS. 3 and 4, the casing means 32 is adapted to form an outer or seal pressurization chamber 98 enclosing the intermediate sump 62, a seal pressurization chamber 100 for the downstream sump 64 and a seal pressurization chamber 102 for the downstream sump 66.

A first tubular member or pipe 104 is suitably secured coaxially with the inner shaft 12 in radial-spaced relationship thereto so as to define a central vent passage 106 inwardly of the tube 104 and a first annular fluid passage 108 between the tube 104 and the inner shaft 12. As shown in FIG. 1, the upstream ends of passages 106 and 108 are closed by a suitable closure member 110. As shown in FIG. 4, the downstream end 112 of the tube 104 is open and communicates with the outlet 38 of the motive fluid flow passage 34.

As shown in FIGS. 2 and 4, a plurality of generally radially extending vent conduits 114 are provided to communicate the central vent passage 106 with the upstream sump 60 and the downstream sumps 64 and 66 so as to vent these sumps to the low pressure existing at the downstream end 112 of the tube 104. The vent conduits 114 are suitably sized to accelerate the air-lubricant mixture being vented therethrough to a tangential velocity sufficient to centrifuge or centrifugally separate dense lubricant particles therefrom and return such particles to their respective sump.

Fan-pressurized air is delivered from the upstream seal pressurization chamber 86 to the first annular passage 108 through openings 116 in the inner shaft fan rotor 16 and suitable radial passages 118 as shown in FIG. 2. The fan-pressurized air is then carried downstream within the passage 108 and delivered into downstream seal pressurization chambers 100 and 102 through inner shaft openings 120 and 122, respectively. An annular member 124 may be provided as in FIG. 4 to form a continuation of the passage 108 across the enlarged turbine rotor 20.

With reference now to FIGS. 2, 3 and 4, a second annular passage 126 is defined intermediate the inner and outer shafts 12 and 14 by providing tube members 128 and 130 concentrically carried by the outer shaft 14 and respectively extending across the enlarged compressor rotor 24 and the enlarged turbine rotor 28. Openings 132 are provided in the outer shaft compressor rotor 24 through which fan-pressurized air is delivered from chamber 96 into the passage 126 through openings 134 in the tube member 128 for pressurization of the intershaft seal 74 associated with the upstream bearing chamber 60 and the intershaft seal 80 associated with the downstream bearing chamber 64.

As shown in FIGS. 2 and 3, the outer shaft 14 concentrically carries a further tubular member 136 which may be secured at its upstream end to a compressor rotor disc 138 and at its downstream end to the base portion of the compressor rotor 24. The tube member 136 is enlarged in diameter relative to the tube member 128 so as to define a third annular flow passage 140 therebetween for delivery of fan-pressurized air from chamber 96 to the seal pressurization chamber 98 associated with the intermediate sump 62 through outer shaft openings 142 as shown in FIG. 3.

Suitable vent conduit means 144 are carried by the casing means 32 to communicate the intermediate sump 62 with the upstream sump 60 for venting of the intermediate sump through the central vent passage 106. As best shown in FIG. 1, the conduit means 144 extend from the sump 62 through at least one strut 54 to the other outer portion of the casing means 32, around the compressor 26 and inwardly across the flow passage 34 through at least one upstream strut 52 to the upstream sump 60.

The use, operation and function of the invention are as follows:

As previously mentioned, a lubricant fluid is delivered into each sump by spray nozzles 68 and returned by suitable scavenge pumps (not shown) to a suitable reservoir for repressurization and redelivery to the spray nozzles 68. Relatively cool fan-pressurized air is directed into upstream seal pressurization chambers 86 and 96 through the strut opening 88, the interior of the strut 52 and openings 90 and 94. The pressurized air within chambers 86 and 96 leaks into the upstream sump 60 through seals 70 and 72. At the same time, fan-pressurized air is delivered from chamber 96 through compressor rotor opening 132, and opening 134 in the tube member 128 into the annular passage 126 and hence into bearing chamber 60 through seal 74. In order to maintain the upstream sump 60 at a lower pressure than that existing in chambers 86 and 96, so as to maintain a continuous flow of the cool air into and through the sump, the sump 60 is vented to the low pressure at the outlet 38 through conduits 114 and the central vent passage 106. As the vented air flows through the conduits 114 from chamber 60 to the vent passage 106, the rotational velocity of the fluid is increased so as to centrifugally separate dense lubricant particles from the vented air and return such particles to the chamber 60 for recirculation by the scavenge pump.

With reference now to FIGS. 2 and 3, fan-pressurized air delivered from upstream seal pressurization chamber 96 to the seal pressurization chamber 98 associated with the intermediate sump 62 through compressor rotor opening 132, annular passage 140 and the outer shaft opening 142. The pressurized air within chamber 98 then leaks into the intermediate sump 62 through seals 76. The pressure within sump 62 is maintained at a reduced level relative to the pressure within chamber 98 by venting sump 62 to the upstream sump 60 through vent conduit means 144. By venting intermediate sump 62 in this manner, lubricating fluid which vaporizes during transit through the hot section strut 54 may be reclassified within upstream sump 60 before the vented air is discharged through the central vent passage 106. To further reduce lubricating fluid losses due to vaporization, a lubicant spray nozzle 68 may be provided at the sump 62 end of vent conduit means 144 to spray lubricant into the portion of the conduit means extending through strut 54 to provide cooling therefor.

As best shown in FIGS. 2 and 4, the fan-pressurized air is delivered from the seal pressurization chamber 86 to the seal pressurization chamber 100 through inner shaft opening 116, radial passages 118, annular passage 108 and the turbine rotor openings 120. In like manner, the fan-pressurized air is delivered to the seal pressurization chamber 102 associated with downstream sump 66 through inner shaft openings 122.

The fan pressurized air within chamber 100 leaks into the downstream sump 64 through seals 78 and 82. At the same time, fan-pressurized air within passage 126 flows into sump 64 through intershaft seal 80. A continuous flow of fan-pressurized air into the sump 64 is achieved by venting the sump to the low pressure of the central vent passage 106 through vent conduits 114 in the manner previously described in connection with upstream sump 60. In like manner, the fan-pressurized air within the seal pressurization chamber 102 leaks through seal 84, into downstream sump 66 and is discharged to the central vent passage 106 through the radial vent conduits 114. It will be noted that the downstream end of the annular passage 108 is closed by suitable annular plug member 145 which extends between the tubular member 104 and the inner shaft 12.

While the vent conduits 114 are highly effective as air-lubricant separators, it will be appreciated that some lubricant mist, or possibly vapor, will be delivered into the central vent passage 106. By surrounding the central passage 106 by annular passage 108 and passing relatively cool fan-pressurized fluid through that passage, reclassification of any lubricant vapor flowing through central vent passage 106 is greately enhanced. Furthermore, since the vented air is swirled in the direction of the inner shaft rotation due to the rotational velocity imparted thereto by vent conduits 114 and the rotation of tube member 104, during transit through the central vent passage 106 lubricant particles entrained with the vented air will be centrifugally separated therefrom and deposited on the wall of tube member 104. Suitable means may then be employed to collect such centrifuged lubricant for return to one of the sumps. For example, the tube member 104 may be provided with an inwardly facing peripheral groove 146 for collecting any such lubricant particles centrifuged from the vented air. A plurality of radially extending conduits 148 may be provided across the annular passage 108 for return of the lubricating fluid so collected to the bearing chamber 60 or, for example as shown in FIG. 1, to lubricate the splined connection 21 between inner shaft portions 16 and 19.

Additional separation of any lubricant particles entrained in the vented air may be achieved by providing vortex generating baffle means 152, as shown in FIG. 4, for imparting a circumferential velocity to the vented air-lubricant mixture which is additive to the normal rotational velocity. Lubricant particles centrifuged by means 152 may be returned to the lubricating system through the vent conduits 114 associated with sump 66 or other suitable arrangements such as described in connection with the upstream spline 21. A straightening vane 154 may be provided to reduce any pressure drop within the vent passage 106 which may be caused by the vortex generating means 152.

As shown in FIG. 1, the outlet 38 is adapted to converge the annular hot gas exhaust flow. By venting the sumps at the center of this converging exhaust stream, the pressure inside the engine sumps at altitudes in excess of 40,000 ft. is maintained sufficiently high to prevent any loss of volumetric efficiency of the scavenge pumps which might otherwise be experienced.

From the above, it will be appreciated that the present invention provides a highly effective and simplified system for providing a flow of relatively cool air through each sump or bearing chamber while reducing lubricating fluid losses from the sump lubrication system.

Although the present invention has been shown and described in connection with a dual shafted gas turbine engine of the bypass fan type, it should be understood that this invention may be effectively employed by non-bypass fan engines having more or less than two shafts.

Furthermore, while a preferred embodiment of the present invention has been depicted and described, it will be appreciated by those skilled in the art that many additions, modifications and changes may be made thereto without departing from the fundamental theme of the present invention.

What is claimed is:

1. In a gas turbine engine having a first hollow shaft operatively connecting a first compressor portion and a second turbine portion of said engine, said first shaft journaled for rotation by at least two axially spaced bearing assemblies, casing means adapted to define, in cooperation with at least said first shaft, an upstream bearing chamber and at least a first axially spaced downstream bearing chamber, said bearing chamber adapted to enclose said bearing assemblies and receive a lubricating fluid, means for delivery of air into said bearing chambers, and means for venting said bearing chambers to establish a continuous flow of said air through said bearing chambers, said venting means comprising a central vent passage defined within said first shaft, said central vent passage being closed at its upstream end and open at its downstream end for discharge of fluid therefrom, at least one generally radially disposed vent conduit for said upstream bearing chamber and said first downstream bearing chamber, each said vent conduit communicating its respective bearing chamber with said central vent passage and sized to accelerate the air-lubricant mixture vented therethrough to a tangential velocity sufficient to centrifugally separate dense lubricant particles therefrom and prevent said separate particles from entering said central vent passage.

2. The improved gas turbine engine of claim 1 further characterized by and including vortex-generating means carried by said first shaft and disposed within said central vent passage downstream of the vent conduit associated with said upstream bearing chamber, said vortex-generating means adapted to increase the rotational velocity of the air-lubricant mixture flowing through said central vent passage to thereby centrifugally separate lubricant particles therefrom.

3. The gas turbine engine of claim 1 further characterized in that said upstream and downstream bearing chambers include at least one seal at the junction of said first shaft and the portion of said casing means defining said bearing chamber, said air delivery means including an upstream seal pressurization chamber for pressurizing at least one said upstream bearing chamber seal outwardly of said upstream bearing chamber to establish a flow of air into said upstream bearing chamber through said seal, a downstream seal pressurization chamber for pressurizing at least one said seal associated with said downstream bearing chamber outwardly of said downstream bearing chamber to establish a flow of air into said downstream bearing chamber through said downstream bearing chamber seal.

4. The gas turbine engine of claim 3 wherein said air delivery means further includes means for directing air pressurized by said engine first compressor portion into said upstream seal pressurization chamber and a first tubular member coaxially carried by and within said first shaft, said first tubular member defining said central vent passage therewithin and being radially spaced from said first shaft so as to define a first annular passage therebetween communicating said upstream and downstream seal pressurization chambers to thereby direct said pressurized air to said downstream seal pressurization chamber and provide cooling for said central vent passage.

5. The gas turbine engine of claim 1 further characterized by and including an outer shaft concentrically disposed about said first shaft intermediate said first compressor portion and said second turbine portion and operatively connecting a second compressor portion and a first turbine portion of said engine, said outer shaft journaled for rotation by bearing assemblies disposed at least adjacent the ends of said outer shaft, said upstream bearing chamber and said first downstream bearing chamber adapted to enclose respectively at least a portion of the upstream and downstream ends of said outer shaft and said outer shaft bearing assemblies.

6. The gas turbine engine of claim 5 further characterized by an intershaft seal disposed adjacent the ends of said outer shaft and further defining a portion of said upstream and said first downstream bearing chambers, said air delivery means including passage means defined at least in part by and internally of said outer shaft for delivery of air pressurized by said first compressor portion to each said intershaft seal, outwardly of its associated bearing chamber, for leakage into said bearing chamber through said intershaft seal.

7. The gas turbine engine of claim 1 further characterized by and including an outer shaft concentrically disposed about said first shaft intermediate said first compressor portion and said second turbine portion and operatively connecting a second compressor portion and a first turbine portion of said engine, said outer shaft journaled for rotation by at least one bearing assembly disposed intermediate the ends of said outer shaft, said casing means adapted to define, in cooperation with said outer shaft, an intermediate bearing chamber adapted to enclose said intermediate bearing assemblies and receive a lubricating fluid, means for delivery of air into said intermediate bearing chamber for cooling of said lubricating fluid, and vent conduit means carried by said casing means for venting said intermediate bearing chamber to said upstream bearing chamber and, hence, to said central vent passage to establish a continuous flow of said air through said intermediate bearing chamber.

8. The gas turbine engine of claim 7 further characterized by and including means for injecting a lubricant spray into said vent conduit means to cool said conduit means and reduce vaporization of lubricant particles entrained in the air-lubricant mixture vented from said intermediate bearing chamber during transit through said conduit means.

9. The gas turbine engine of claim 7 further characterized in that said intermediate bearing chamber includes at least one seal at the junction of said outer shaft and the portion of said casing means defining said intermediate bearing chamber, said intermediate bearing chamber air delivery means including a seal pressurization chamber communicating with at least one said intermediate bearing chamber seal and passage means for delivery of air pressurized by said first compressor portion through said outer shaft to said intermediate seal pressurization chamber for leakage through said intermediate bearing chamber seal into said intermediate bearing chamber.

10. A gas turbine engine including, in combination:
a first and second compressor and a first and second turbine arranged in serial flow relation;
concentric inner and outer hollow shafts operatively connecting, respectively, a portion of said first compressor with a portion of said second turbine and a portion of said second compressor with a portion of said first turbine;
casing means enclosing at least said second compressor and said turbines, said casing means adapted to define, at least in part, a generally annular motive flow passage therethrough having an inlet upstream of at least said second compressor and an outlet downstream of said second turbine;
bearing means carried by said casing means at four axially spaced locations for rotatably supporting said shafts;
said casing means further defining, in cooperation with at least one said shaft, a bearing chamber at each of said four locations adapted to enclose said bearing means and receive a lubricating fluid, means for supplying lubricating fluid to said bearing chambers; the upstream one of said bearing chambers disposed adjacent the upstream end of said outer shaft, another of said bearing chambers disposed intermediate the ends of said outer shaft and the remaining ones of said bearing chambers disposed downstream of said intermediate bearing chamber;
a first tubular member coaxially carried by and within said inner shaft and forming a central vent passage inwardly thereof and a first annular fluid passage intermediate said tubular member and said inner shaft, said central vent passage being closed at its upstream end and open at its downstream end for discharge of fluid therefrom; and at least one vent conduit for said upstream bearing chamber and said downstream bearing chambers, extending generally radially between said first tubular member and said inner shaft, each said vent conduit communicating said central vent passage with its respective bearing chamber and sized to accelerate the air-lubricant mixture vented therethrough to a tangential velocity sufficient to centrifugally separate dense lubricant particles therefrom and prevent said separated particles from entering said central passage, and conduit means carried by said casing means for communicating said intermediate bearing chamber with said upstream bearing chamber for venting said intermediate bearing chamber to said central vent passage through said upstream chamber.

11. The gas turbine engine of claim 10 further characterized by and including a first and a second seal pressurization chamber associated with said upstream bearing chamber, a seal pressurization chamber associated with each remaining bearing chamber, seal means disposed intermediate each said seal pressurization chamber and its respective bearing chamber, means for directing air pressurized by said first compressor into said first and second seal pressurization chambers for leakage through said seals into said upstream bearing chamber, first means for delivery of said pressurized air from said first seal pressurization chambers through said first annular passage to the seal pressurization chambers associated with said downstream bearing chambers for leakage into said downstream chambers, and second means for delivery of said pressurized air from said second seal pressurization chamber through said outer shaft to the seal pressurization chamber associated with said intermediate bearing chamber for leakage into said intermediate chamber.

12. The gas turbine engine of claim 11 further characterized in that said upstream bearing chamber and the upstream one of said downstream bearing chambers enclose, respectively, a portion of the upstream and downstream ends of said outer shaft and are further defined, in part, by intershaft seal means adjacent each end of said outer shaft, and third means for delivery of said pressurized air from said second seal pressurization chamber to each said intershaft seal.

13. The gas turbine engine of claim 12 further characterized in that said second and third air delivery means include, a second and third tubular member coaxially carried by and within said outer shaft so as to define a second annular fluid passage about said inner shaft and communicating with said intershaft seal means, a fourth tubular member concentrically carried by and within said outer shaft about said second tubular member so as to define a third annular fluid passage between said second and fourth tubular members, said outer shaft formed with at least one upstream and downstream opening communicating, respectively, said second seal pressurization chamber with said third annular passage and said third annular passage with said intermediate seal pressurization chamber, said second tubular member formed with at least one opening communicating said second and third annular passages.

14. The gas turbine engine of claim 10 further characterized in that said inner shaft comprises at least two portions operatively joined at a splined connection downstream of the vent conduit associated with one of said bearing chambers, and means for collection of lubricating fluid centifugally separated from the air-lubricant mixture in said central vent passage and deposited on the walls thereof and for delivery of said collected lubricating fluid to said splined connection.

References Cited
UNITED STATES PATENTS

| | | | |
|---|---|---|---|
| 2,870,870 | 1/1959 | Haworth et al. | 60—39.08 |
| 2,951,337 | 9/1960 | Atkinson et al. | 60—39.08 |
| 3,382,670 | 5/1968 | Venable | 60—39.08 |

CARLTON R. CROYLE, Primary Examiner

U.S. Cl. X.R.

60—39.16, 39.66, 226; 184—6